(No Model.)

H. F. QUIGLEY.
CHURN.

No. 504,174. Patented Aug. 29, 1893.

WITNESSES:

INVENTOR
H. F. Quigley
BY Munn & Co.
ATTORNEYS.

UNITED STATES PATENT OFFICE.

HIRAM F. QUIGLEY, OF ATOKA, INDIAN TERRITORY.

CHURN.

SPECIFICATION forming part of Letters Patent No. 504,174, dated August 29, 1893.

Application filed August 24, 1892. Serial No. 443,955. (No model.)

*To all whom it may concern:*

Be it known that I, HIRAM F. QUIGLEY, of Atoka, in the county of Atoka, Indian Territory, have invented a new and useful Improvement in Churns, of which the following is a full, clear, and exact description.

This invention relates to reciprocating dasher churns, and consists in a novel construction of the same in which a perforated and specially constructed cylinder for the dasher to work in is used in connection with an outer cylinder or chamber, substantially as hereinafter described and more particularly pointed out in the claim.

Figure 1:
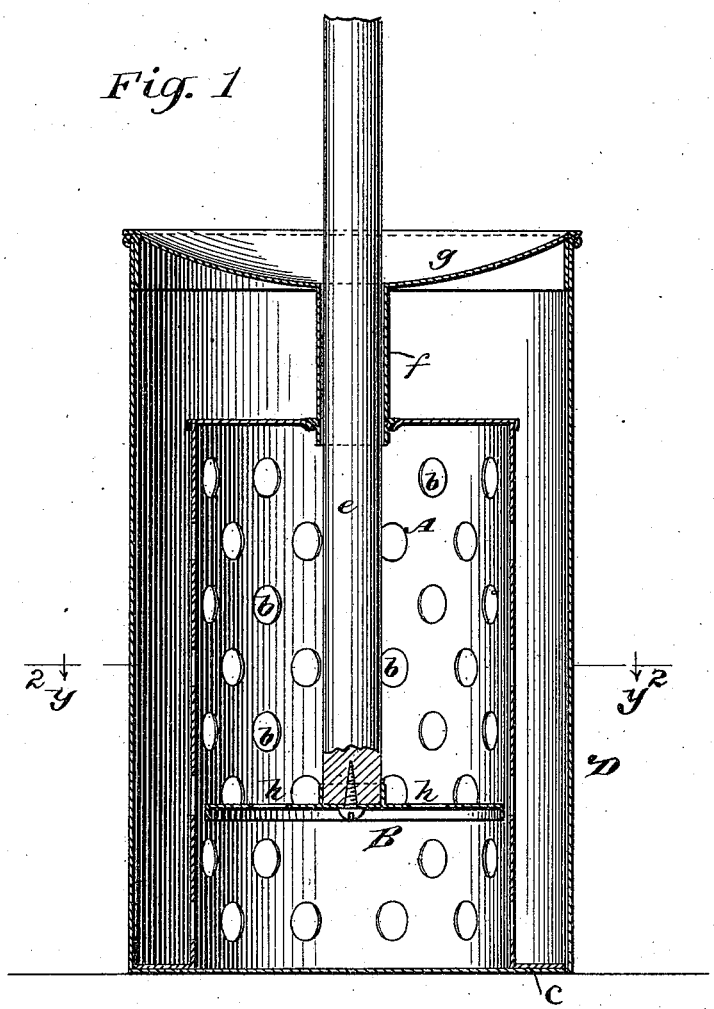
Figure 2:
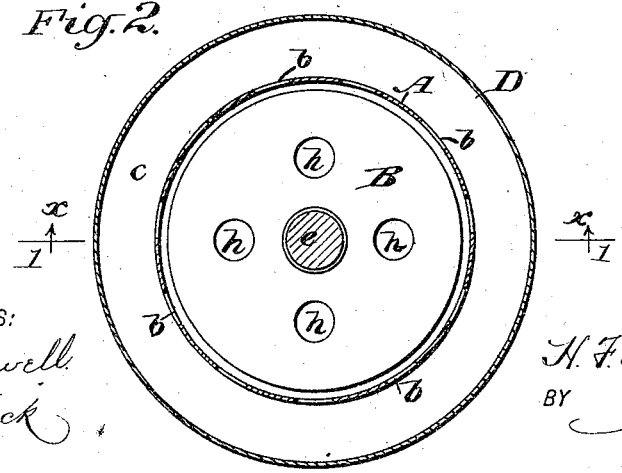

Figure 1 represents a vertical sectional view of a churn embodying my invention, the section being taken upon the line 1—1 in Fig. 2, looking in direction of the arrows $x$; and Fig. 2 is a horizontal section of the same upon the line 2—2 in Fig. 1, looking in direction of the arrows $y$.

A, is an upright cylinder preferably made of galvanized iron or other suitable metal. This cylinder is the one in which the up and down reciprocating dasher works, and it is perforated at its sides, the same being provided with a large number of small lateral apertures $b$, of about five-eighths of an inch in diameter (more or less) in and around it throughout its length. Said cylinder A is open at its bottom and is constructed with an outside lower encircling flange $c$ which rests upon the bottom of an outer close cylinder D that receives the perforated cylinder A concentrically within it, the outer diameter of the flange $c$ being about or nearly the same as the interior diameter of the outer cylinder D. The perforated cylinder A is closed at its top, with the exception of an opening for the dasher rod $e$ to pass through and fit in a tubular sleeve $f$ projecting down from the removable lid or cover $g$ of the cylinder D through which said rod also passes.

B is the dasher and $h, h$, indicate apertures made in or through it.

In the operation of the churn, as the dasher makes a stroke up and down, the cream will be passed through the perforations $b$ in the cylinder A twice, that is, first be forcibly expelled from the inner cylinder through said perforations and afterward be returned through the same. The perforations $b$ have a syringe nozzle-like action and as the cream is forcibly expelled through said perforations it strikes against the walls of the outer chamber D, which scatters or breaks it up, and as it comes back through said perforations it is pressed together. The churn gathers the butter as it is made and when the dasher is at the top of the cylinder, air passes in under the dasher and when the latter is pressed down again, the air mingles with the cream and assists in making the butter. After the cream has been churned, the perforated cylinder A is lifted out and brings out the butter at the one lift, the butter forming upon the top of the butter-milk and upon the sides of the perforated cylinder, as the latter rests by its flange $c$ upon the bottom of the outer cylinder, before lifting the butter out from the churn by removing the lid $g$ of the outer cylinder and lifting the perforated cylinder A out. The flange $c$ of the perforated cylinder acts as a lifter of the butter and to clear any of it forming on the inside of the outer cylinder or lying between the two cylinders. The butter and the butter-milk will not stick to the perforated cylinder to interfere with its ready removal, and the cream will not splash out of the churn while being worked.

A child may readily operate the churn, and the perforated cylinder with its inclosed dasher can easily be used in any dasher churn having a churn body or outer cylinder made of wood, stone, tin, galvanized iron, or other material.

Having thus fully described my invention, I claim as new and desire to secure by Letters Patent—

A churn comprising the outer cylinder D, the inner foraminated cylinder having a central aperture in its upper end and a horizontal butter raising flange extending from the edge of its lower open end to the inner wall of the outer cylinder, the removable cover $g$ having a central guide tube $f$ registering at its lower end with the aperture in the upper end of the inner cylinder, and a dasher within the inner cylinder having a shaft extending up through the tube $f$ and cover $g$, substantially as set forth.

HIRAM F. QUIGLEY.

Witnesses:
THOMAS INGE,
RICHARD J. INGE.